(12) United States Patent
Watanabe et al.

(10) Patent No.: US 7,663,810 B2
(45) Date of Patent: Feb. 16, 2010

(54) LENS BARREL AND METHOD FOR MANUFACTURING THE SAME

(75) Inventors: Tsuneo Watanabe, Tokyo (JP); Teppei Okuyama, Tokyo (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 12/015,765

(22) Filed: Jan. 17, 2008

(65) Prior Publication Data

US 2008/0192367 A1   Aug. 14, 2008

(30) Foreign Application Priority Data

Jan. 19, 2007   (JP) ............................. 2007-010423

(51) Int. Cl.
G02B 15/22 (2006.01)
G02B 13/20 (2006.01)

(52) U.S. Cl. ...................................... 359/696; 359/704
(58) Field of Classification Search .................. 359/696, 359/704
See application file for complete search history.

(56) References Cited

U.S. PATENT DOCUMENTS

| 3,896,466 A | 7/1975 | Korpert |
| 5,966,248 A * | 10/1999 | Kurokawa et al. .......... 359/697 |
| 7,567,284 B2 | 7/2009 | Ikemachi et al. |
| 2004/0105168 A1* | 6/2004 | Hamasaki ................... 359/696 |

FOREIGN PATENT DOCUMENTS

| DE | 2234728 | 1/1974 |
| EP | 0038413 | 10/1981 |
| JP | 06-011636 | 1/1994 |
| JP | 2005-010281 | 1/2005 |

* cited by examiner

Primary Examiner—Jordan M. Schwartz
Assistant Examiner—James C Jones
(74) Attorney, Agent, or Firm—Ditthavong Mori & Steiner, P.C.

(57) ABSTRACT

To provide a lens barrel having an improved assembly accuracy. The lens barrel is provided with: a stationary part; a movable part provided movably relative to the stationary part, its movement moving a lens relative to the stationary part; a rotary member to transfer to the movable part a driving force for moving the movable part relative to the stationary part; and a supporting part provided integrally with the stationary part to support a rotary axis of the rotary member.

20 Claims, 5 Drawing Sheets

LENS BARREL AND METHOD FOR MANUFACTURING THE SAME

The disclosure of the following priority application is herein incorporated by reference: Japanese Patent Application No. 2007-010423 filed on Jan. 19, 2007.

BACKGROUND OF THE INVENTION

1. Field of the Invention

The present invention relates to lens barrel and method for manufacturing the same.

2. Description of the Related Art

An interchangeable lens used for a camera system or the like is known, which is provided with a driving unit in which an actuator for driving a lens and a gear train for transferring an output of the actuator have been unitized in advance (for example, see Japanese Unexamined Patent Application Publication No. H6-011636).

However, this interchangeable lens of the prior art may be subject to engagement failure between the gear train and a gear provided for a driven member due to an assembly error of the driving unit with respect to the stationary tube.

SUMMARY OF THE INVENTION

An object of the present invention is to provide a lens barrel having an improved accuracy of assembly.

In order to achieve the object mentioned above, according to the first aspect of the present invention, there is provided a lens barrel comprising: a stationary part; a movable part provided movably relative to the stationary part, its movement causing a lens to move relative to the stationary part; a rotary member to transfer a driving force for moving the movable part relative to the stationary part to the movable part; and a supporting part provided at the stationary part integrally therewith to support a rotary axis of the rotary member.

The lens barrel may comprise a lens barrel side mount detachably engaged with a camera side mount provided on a camera body, the stationary part may be fixed to the camera body.

The lens barrel may comprise a mount part detachably fixed to a camera body, the stationary part may be fixed to the mount part.

A lens may be accommodated in the stationary part.

The lens barrel may comprise an actuator to generate the driving force, the actuator being fixed to the supporting part.

The rotary member may be a gear train including a first gear to which an output of the actuator is transferred and a final gear that can be meshed with a movable part side gear provided on the movable part.

The gear train may be disposed in such a manner that the rotary axis is in parallel with an optical axis of the lens, and the rotary axes are arranged around an axis having its center at the optical axis or its vicinity.

An output axis of the actuator and the rotary axis of the gear train may be arranged in parallel with an optical axis of the lens, and the output axis and the rotary axis are arranged around an axis having its center at the optical axis or its vicinity.

A plurality of rotary members may be provided, the plurality of rotary members may be arranged in such a manner that the rotary axis is in parallel with an optical axis of the lens, and these rotary axes may be arranged around an axis having its center at the optical axis or its vicinity.

The stationary part may be formed by a first part including a first supporting part to support a side of one end of the rotary axis and a second part including a second supporting part to support a side of the other end of the rotary axis.

According to the second aspect of the present invention, there is provided a method of manufacturing a lens barrel, including:

providing a stationary part; providing a movable part that is movable relative to the stationary part, its movement causing a lens to move relative to the stationary part; providing a rotary part to transfer to the movable part a driving force which moves the movable part relative to the stationary part; and providing a supporting part integrally with the stationary part, and which supports a rotary axis of the rotary member.

The method may include: providing a lens barrel side mount detachably engaged with a camera side mount provided at a camera body, and fixing the stationary part relative to the camera body.

The method may include: providing a mount part for detachable fixation to a camera body, and fixing the stationary part relative to the mount part.

The method may include: accommodating a lens in the stationary part.

The method may include: providing an actuator to generate the driving force; and fixing the actuator to the supporting part.

In the method, the rotary member may be a gear train including a first gear to which an output of the actuator is transferred and a final gear that can be meshed with a movable part side gear provided at the movable part.

The method may include: arranging the gear train in such a manner that the rotary axis is in parallel with an optical axis of the lens, and arranging the rotary axes around an axis having its center at the optical axis or its vicinity.

The method may include: arranging an output axis of the actuator and the rotary axis of the gear train in parallel with an optical axis of the lens, and arranging the output axis and the rotary axis around an axis having its center at the optical axis or its vicinity.

The method may include: providing a plurality of said rotary members; arranging the plurality of rotary members in such a manner that the rotary axes are in parallel with the optical axis of the lens; and arranging these rotary axes around an axis having its center at the optical axis or its vicinity.

In the method may include: constituting the stationary part by a first part including a first supporting part to support a side of one end of the rotary axis, and a second part including a second supporting part to support a side of the other end of the rotary axis.

According to the present invention, it is possible to provide a lens barrel having an improved accuracy of assembly.

DETAILED DESCRIPTION OF THE PREFERRED EMBODIMENT

First Embodiment

Now, a more detailed explanation will be given with reference to the drawings and more according to embodiments of the present invention. It should be noted that the following embodiments will be explained by taking an interchangeable lens as an example of a lens barrel.

The interchangeable lens of the first embodiment forms a camera system together with a camera body (not shown), and is configured to be detachably fitted to the camera body. The interchangeable lens can switch between an AF mode for performing a focusing operation according to publicly-known AF (auto focus) control, and an MF (manual focus) mode for performing a focusing operation in dependence on a photographer's manual input.

Figure 1:
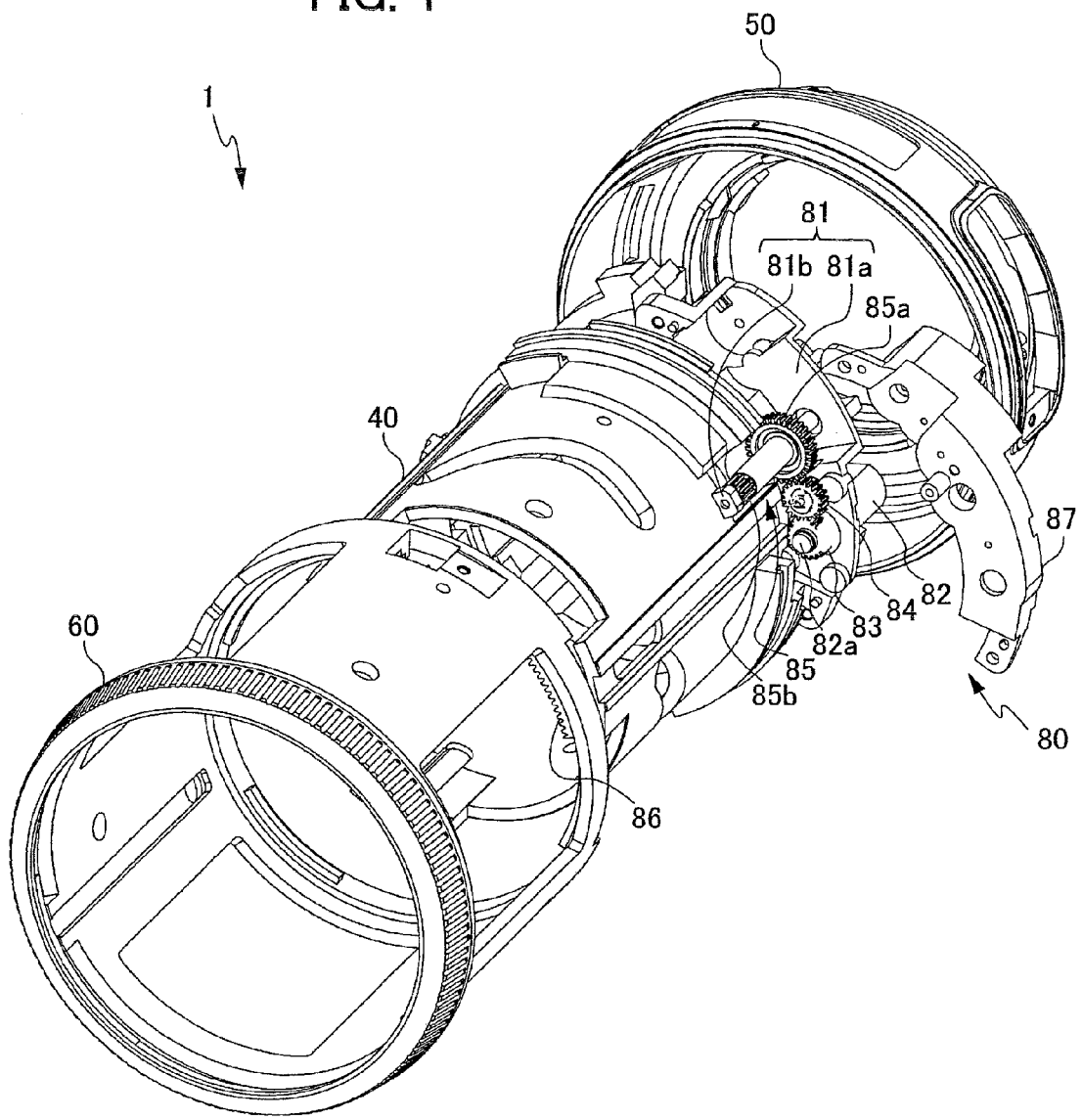
FIG. 1 is an exploded perspective view showing an interchangeable lens of the first embodiment.

FIG. 1 shows an exploded perspective view showing the interchangeable lens of the first embodiment.

Figure 2:
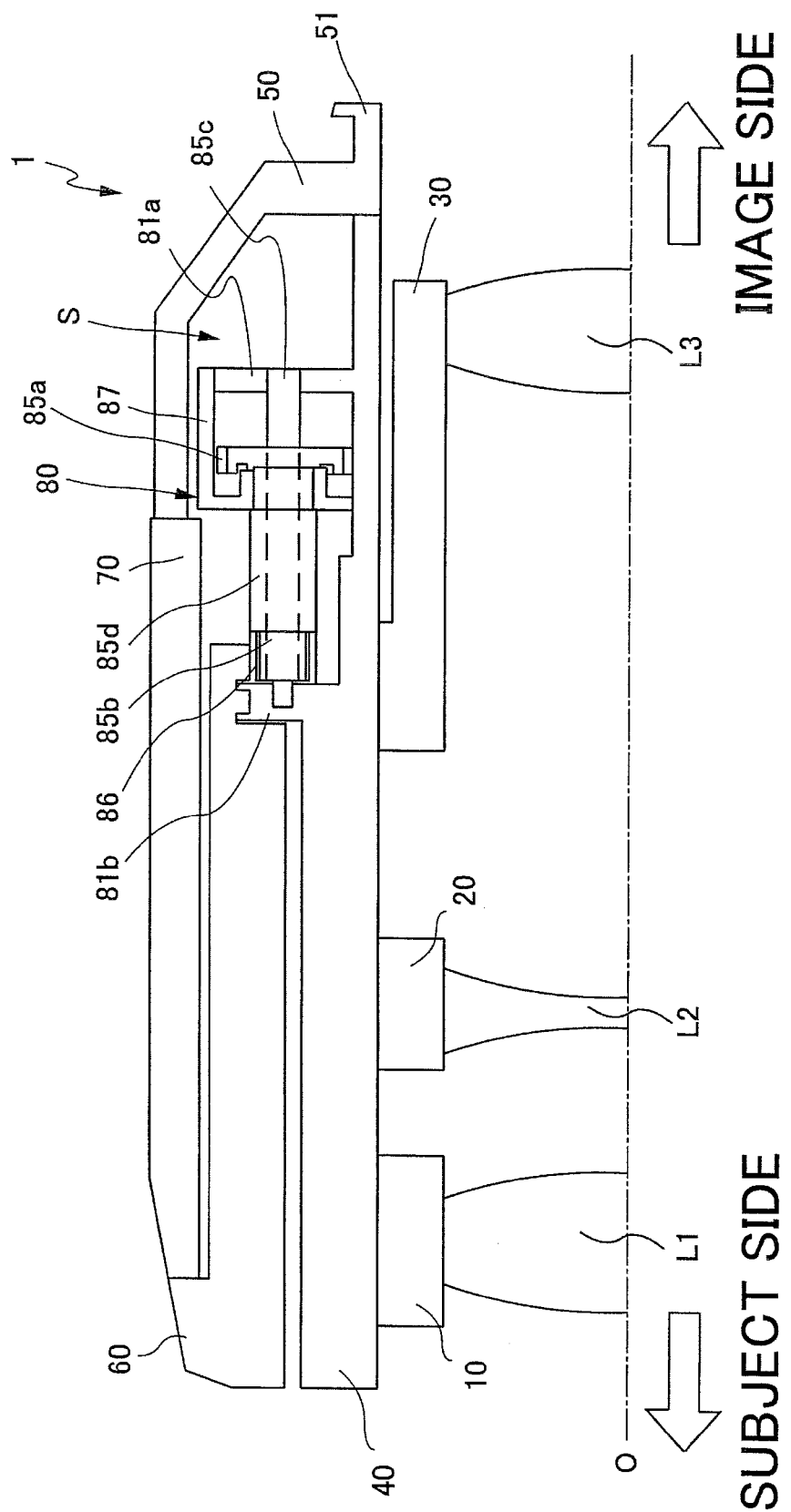
FIG. 2 is a cross-partial view including the optical axis of the interchangeable lens shown in FIG. 1.

FIG. 2 is a cross-partial view including the optical axis of the interchangeable lens shown in FIG. 1. FIG. 2 shows a portion including a final gear (described later) provided on the interchangeable lens.

Figure 3:
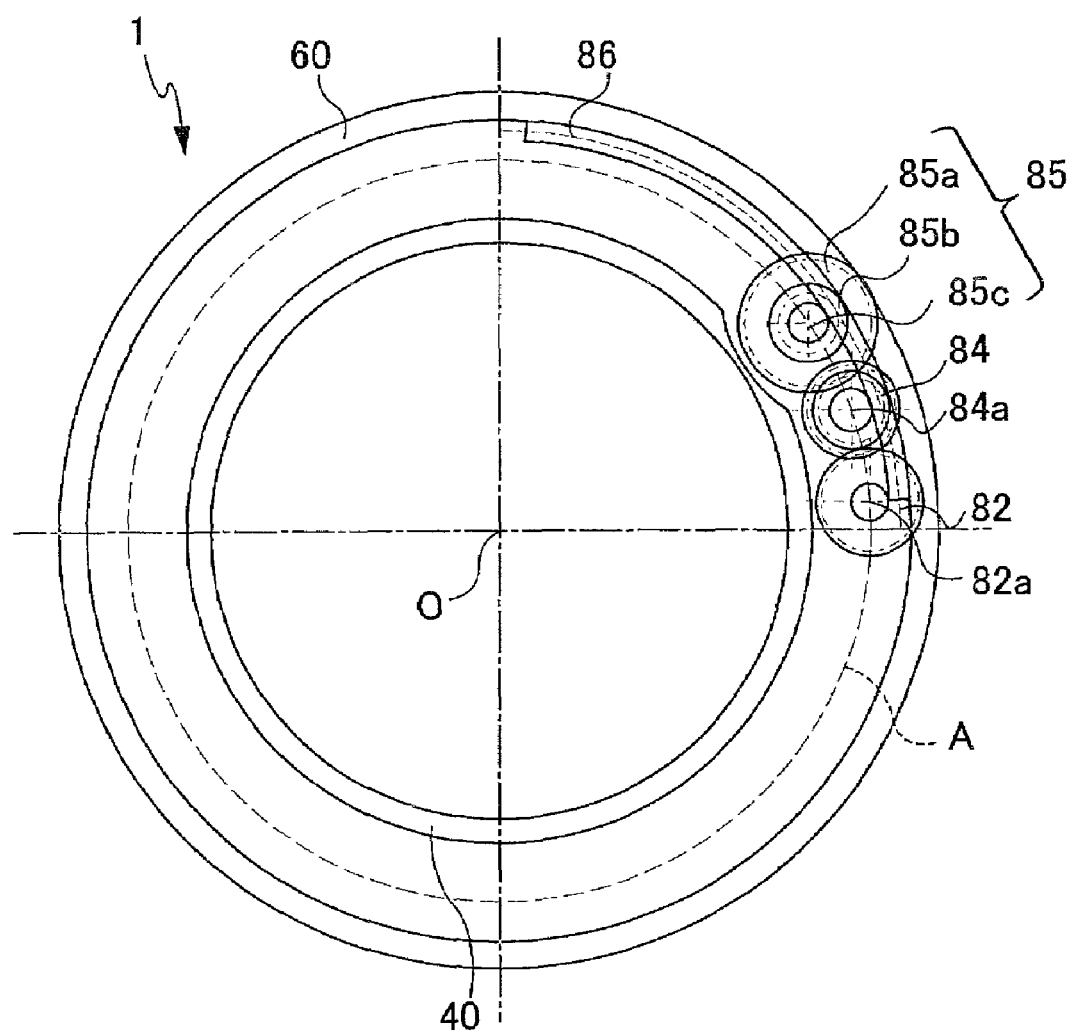
FIG. 3 is an illustration showing the layout of each gear provided on the interchangeable lens shown in FIG. 1.

FIG. 3 is an illustration showing a layout of each gear provided on the interchangeable lens of FIG. 2, which is obtained by viewing the interchangeable lens in an optical axis.

As shown in FIG. 2, the interchangeable lens 1 is provided with a first lens unit L1, a second lens unit L2, a third lens unit L3, a first lens unit chamber 10, a second lens unit chamber 20, a third lens unit holding tube 30, a stationary tube 40, an outer tube 50, a focus operation tube 60, a zoom operation tube 70 and a driving part 80. It is noted that FIG. 1 is illustrated with the lens units L1-L3 and the zoom operation tube 70 omitted.

The first lens unit L1, the second lens unit L2 and the third lens unit L3 form a zoom lens with a three-group construction, and are arranged in this order from the subject side toward the image side (the side of the photographer) along the optical axis. The interchangeable lens 1 is configured to move the first lens unit L1 and the third lens unit L3 along the optical axis at the time of a zoom operation, and to move the second lens unit L2 along the optical axis at the time of a focusing operation.

The first lens unit chamber 10 and the second lens unit chamber 20 both are formed with a annulus shape, and are frame bodies for holding the first lens unit L1 and the second lens unit L2, respectively, in their internal diameter sides.

The third lens unit holding tube 30 is a member formed with a annulus shape for holding the third lens unit L3.

The stationary tube 40 is a tube body which is restricted in movement relative to the camera body in the state where the interchangeable lens 1 is fitted to the camera body. The above-mentioned first lens unit chamber 10, the second lens unit chamber 20 and the third lens unit holding tube 30 are each accommodated in an internal diameter side of the stationary tube 40. The center of this stationary tube 40 in a radial direction is substantially identical with the optical axis O of the lens units L1-L3.

The outer tube 50 is a tube body forming a part of an outer surface of the interchangeable lens 1, which is disposed on an outer diameter side of the stationary tube 40. The outer tube 50 is formed with a larger size in its radial direction than the stationary tube 40, and a space S is formed between the outer tube 50 and the stationary tube 40.

The outer tube 50 is formed with a size in its radial direction tapering from its intermediate portion to its end at the image side in the optical axis direction, and the vicinity of its end at the image side in the optical axis direction is connected to an end of the stationary tube 40 at the image side in the optical axis direction.

The outer tube 50 is provided with a lens barrel side mount 51 on its end on the image side in the optical axis direction, in a portion closer to the image side in the optical axis direction than its connecting part with the stationary tube 40.

The lens barrel side mount 51 is for detachably affixing the interchangeable lens 1 to the camera body in cooperation with a camera side mount (not shown) provided on the camera body.

The stationary tube 40 is provided in state of being fixed to the lens barrel side mount 51. In other words, the stationary tube 40 is restricted in movement relative to the lens barrel side mount 51.

The focus operation tube 60 is a tube body disposed on a side of an outer diameter of the stationary tube 40, and is placed substantially concentrically with the stationary tube 40.

The focus operation tube 60 is set to be rotatable about the optical axis with respect to the stationary tube 40, and is intended to be manually rotated relative to the stationary tube 40 when the photographer carries out the MF operation. The interchangeable lens 1 is provided with a cam mechanism for focusing (not shown), whereby the second lens unit chamber 20 that holds the second lens unit L2 can move forward and backward along the optical axis direction in conjunction with the rotation of the focus operation tube 60.

The zoom operation tube 70 is a tube body disposed on a side of an outer diameter of the focus operation tube 60, and is placed substantially concentrically with the stationary tube 40 and the focus operation tube 60.

The zoom operation tube 70 can be rotated about the optical axis with respect to the stationary tube 40 by the photographer at the time of the zoom operation. The interchangeable lens 1 is provided with a cam mechanism for zooming (not shown), whereby the first lens unit L1 and the third lens unit L3 can move forward and backward along the optical axis direction in conjunction with the rotation of the zoom operation tube 70.

The driving part 80 is a part for rotating the movable tube 60 about the optical axis in accordance with a signal from the AF control part (not shown) at the time of AF control.

The driving part 80 is provided with a supporting part 81, an ultrasonic motor 82 (SWM 82), a pinion 83, an intermediate gear 84, a final gear 85, a focus operation tube side gear 86 and a cover 87, as shown in FIG. 1.

The supporting part 81 is a part for supporting an SWM 82, the intermediate gear 84 and the final gear 85 (described later) with respect to the stationary tube 40. The supporting part 81 is provided with an SWM supporting part 81a and a bearing part 81b.

The SWM supporting part 81a supports the SWM 82, the intermediate gear 84 (described later) and a side of one end of the rotary axis 85c (see FIG. 2) of the final gear 85. The SWM supporting part 81a is a part formed protruding in a flanged shape to an outer diameter side thereof from a portion of an outer peripheral surface of the stationary tube 40, and is formed integrally with the stationary tube 40.

The bearing part 81b supports the other end side of the rotary axis 85c of the final gear 85. The bearing part 81b is provided to be closer to a subject side in the optical axis direction than the SWM supporting part 81a, which is formed protruding to the outer diameter side from a portion of the outer peripheral surface of the stationary tube 40. This bearing part 81b is also formed integrally with the stationary tube 40.

The SWM 82 is an electrical actuator for converting a progressive vibrational wave occurring in the expanding and contracting operation of a piezoelectric device into a rotational movement and outputting the result, and is provided with an output axis 82a.

The SWM 82 is fixed to a surface portion of the SWM supporting part 81a facing toward the image side in the optical axis direction, and the above-mentioned output axis 82a protrudes closer to the image side in the optical axis direction than the SWM supporting part 81a and penetrates the SWM supporting part 81a.

The pinion 83 is a gear provided at a tip portion of the output axis 82a of the SWM 82, and is intended to rotate integrally with the output axis 82a of the SWM 82.

The intermediate gear 84 is a stepped gear disposed adjacently to the pinion 83, and is intended to reduce and transfer the output of the SWM 82 to the final gear 85 (described later) while decelerating. The rotary axis 84a (see FIG. 3) of the intermediate gear 84 is supported at one end by the SWM supporting part 81a.

The final gear 85 is a gear for transferring the rotation of the intermediate gear 84 to the focus operation tube 60, which is provided with an input side gear 85a, an output side gear 85b and a rotary axis 85c.

The input side gear 85a is a gear meshed with the intermediate gear 84. The output side gear 85b is a gear meshed with the focus operation tube side gear 86 described later.

The input side gear 85a and the output side gear 85b are connected by the connecting tube 85d (see FIG. 2) formed in a hollow cylinder, and are rotated integrally. The rotary axis 85c (see FIG. 2) penetrates the connecting tube 85d, one end of which is pivotally supported on the SWM supporting part 81a, and the other end of which is pivotally supported on the bearing part 81b.

The focus operation tube side gear 86 is an internal gear (segment gear) formed in one portion of an inner peripheral surface of the focus operation tube 60, which is engaged with the output side gear 85b of the final gear 85.

Herein, the output axis 82a of the SWM 82, the rotary axis 84a of the intermediate gear 84 and the rotary axis 85c of the final gear 85 mentioned above are each in parallel with the optical axis O. Then, these output axis 82a, and rotary axis 84a and 85c are arranged on an arc (a reference symbol A in FIG. 3) with its center in the optical axis O (see FIG. 3).

The cover 87 protects the pinion 83, intermediate gear 84, final gear 85 mentioned above, which is secured to the stationary tube 40 by screws, not shown (see FIG. 1).

In the interchangeable lens 1, in the AF mode, for example, the SWM 82 is driven in dependence on a signal from the AF control part provided at the camera body, and accordingly the output axis 82a of the SWM 82 rotates. The torque of the output axis 82a is transferred to the final gear 85 through the intermediate gear 84.

The rotation of the final gear 85 causes the focus operation tube 60 to rotate about the optical axis. The rotation of the focus operation tube 60 causes the second lens unit chamber 20 holding the second lens unit L2 to move forward and backward in the optical axis direction through the focus cam mechanism, and whereby AF is carried out for the interchangeable lens 1.

On the other hand, in the interchangeable lens 1, in the MF mode, the focus operation tube 60 is subjected to a rotary operation about the optical axis manually by the photographer. The focus operation tube 60 moves the second lens unit chamber 20 forward and backward in the optical direction based on its rotation as with the AF mode, and the MF is carried out for the interchangeable lens 1.

According to the interchangeable lens 1 described above, it is possible to obtain the following advantages.

(1) An interchangeable lens wherein the SWM 82, the pinion 83 and the final gear 85 have been unitized in advance, and the resultant driving unit is attached to the stationary tube is considered. Hereinafter, the lens is referred to as an "comparative form of the interchangeable lens". The comparative form interchangeable lens is not shown as drawing. The comparative form of the interchangeable lens may be unstable in the positional relationship between the stationary tube and the driving unit due to an assembly error or the like caused in the mounting portion of the driving unit and the stationary tube.

Then, such reduction of an assembly accuracy of the driving unit with respect to the stationary tube may became a cause of engagement failure between the final gear and the focus operation side gear, thereby leading to a reduction of the accuracy of driving and/or a large noise occurring at the time of driving.

In contrast to this, in the interchangeable lens 1 of the present embodiment, the SWM supporting part 81a supporting the SWM 82, the intermediate gear 84 and a side of one end of the rotary axis 85c of the final gear 85, and the bearing part 81b supporting a side of the other end of the rotary axis 85c of the final gear 85, are integrally formed with the stationary tube 40. Since the embodiment is constituted such that the stationary tube 40 directly holds the SWM 82, the intermediate gear 84 and the final gear 85, high stability is realized in the positional relationship between the final gear 85 and the focus operation tube side gear 86. Therefore, it is possible to avoid engagement failures between the output side gear 85b of the final gear 85 and the focus operation tube side gear 86, thus performing the AF with high accuracy.

In addition, since the interchangeable lens 1 of the embodiment does not require a process of mounting the driving unit to the stationary tube as compared with the comparative form of the interchangeable lens, it is possible to reduce the number of manufacturing steps.

(2) Since the output axis 82a of the SWM 82, the rotary axis 84a of the intermediate gear 84, and the rotary axis 85c of the final gear 85 are disposed on the arc A having its center in the optical axis O, they can be placed along an outer peripheral surface of the stationary tube 40. Therefore, it is possible to effectively use the space S provided between the stationary tube 40 and the outer tube 50, and thereby the interchangeable lens 1 can be more compact.

(3) As the positional relationship between the final gear 85 and the focus operation tube side gear 86 is stable, it is possible to reliably evaluate the load applied to the SWM 82 by the focus cam mechanism. In contrast to this, in the above-mentioned comparative form of the interchangeable lens it is hard to evaluate the load for the SWM 82 since the positional relationship between the final gear 85 and the focus operation tube side gear 86 may vary depending on the individual the interchangeable lens.

(4) Since there is provided a cover 87 covering a gear train (the pinion 83, the intermediate gear 84 and the final gear 85), the silence property of the AF operation is improved.

Second Embodiment

Next, an explanation will be given concerning the second embodiment of the present invention. In the second embodiment, every element serving a function similar to that in the above-described the first embodiment is denoted by the same reference symbol or a reference symbol having consistent final numbers, for appropriate omission of overlap of the description and drawing.

Figure 4:
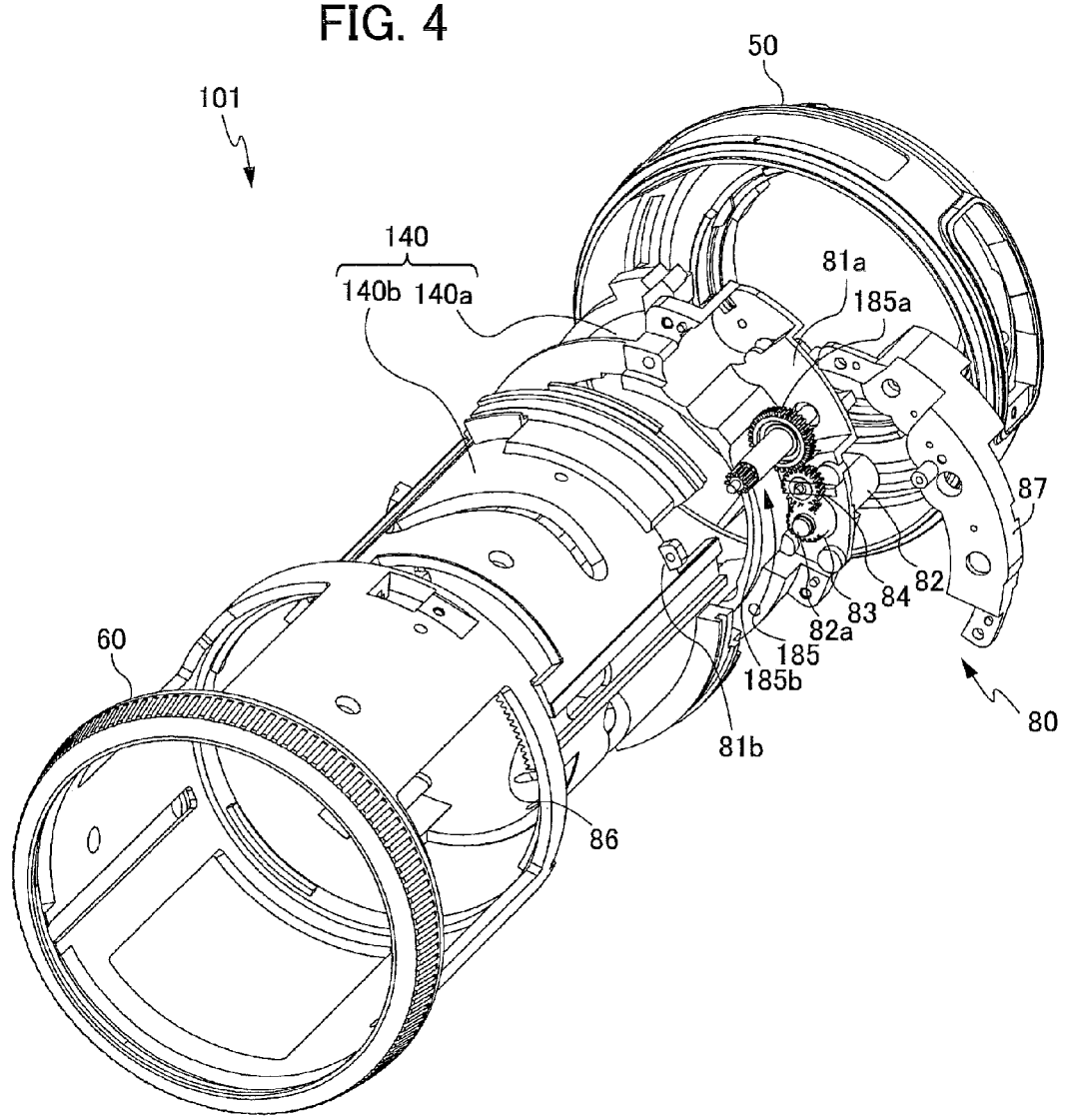
FIG. 4 is an exploded perspective view showing an interchangeable lens of the second embodiment.

FIG. 4 is an exploded perspective view showing an interchangeable lens of the second embodiment.

Figure 5:
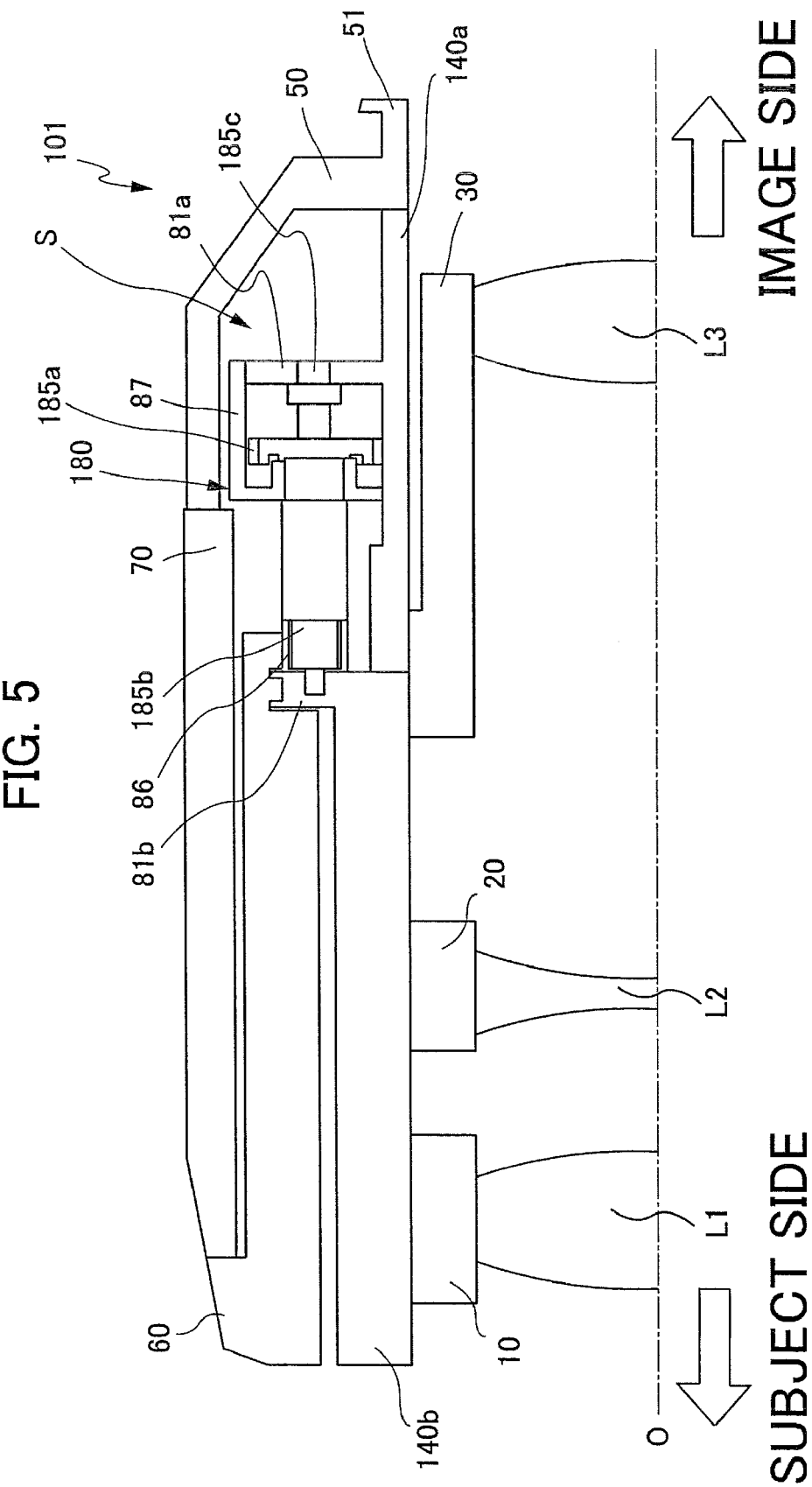
FIG. 5 is a cross-partial view including the optical axis of the interchangeable lens shown in FIG. 4.

FIG. 5 is a cross-partial view including an optical axis of the interchangeable lens shown in FIG. 4.

The interchangeable lens 101 of the second embodiment is different from the first embodiment in which the stationary tube 40 provided at the interchangeable lens 1 has a one-piece structure, in that the stationary tube 140 has a two-piece structure. Additionally, a final gear 185 provided at a driving part 180 has an input side gear 185a, an output side gear 185b and a rotary axis 185c formed integrally.

The following explanation focuses on the stationary tube 140 and the final gear 185.

The stationary tube 140 is provided with an image side tube part 140a and a subject side tube part 140b.

The image side tube part 140a and the subject side tube part 140b show their tube bodies having almost the same size in the diameter direction, whose respective centers are substantially identical with the optical axis O. The image side tube part 140a is placed on the image side in the optical axis direction with respect to the subject side tube part 140b. The image side tube part 140a and the subject side tube part 140b are connected, for example by a screw (not shown), which is intended to enable handling them integrally.

Herein, the supporting part 81a that pivotally supports the SWM 82, the intermediate gear 84 and a side of one end of the rotary axis 185c of the final gear 185 are provided at the image side tube part 140a integrally therewith, and the bearing part 81b for pivotally supporting a side of the other end of the rotary axis 185c of the final gear 185c is provided at the subject side tube part 140b integrally therewith.

Besides, the rotary axis 85c of the final gear 85 is a member distinct from the input side gear 85a and the output side gear 85b in the first embodiment, whereas the final gear 185 in the second embodiment has the input side gear 185a, output side gear 185b and rotary axis 185c formed integrally with each other as shown in FIG. 5. This final gear 185 has a construction in which the respective gears (185a and 185b) and the rotary axis 185c are unified, and thereby the gears and the rotary axis 185c do not jounce, thus making it possible to improve the accuracy of the mesh with the intermediate gear 84 and the focus operation tube side gear 86.

The interchangeable lens 101 of the second embodiment also has a construction in which the stationary tube 140 is provided with the supporting part 81 supporting the driving part 180 (the SWM 82, the intermediate gear 84 and the final gear 185) integrally as with the interchangeable lens 1 of the first embodiment, and thereby it is possible to avoid engagement failures between the final gear 185 and the focus operation tube side gear 86, and to perform the AF with high accuracy.

In addition, since the stationary tube 140 has a 2-piece structure, the final gear 185 into which the gears (185a, 185b) and the rotary axis 185c are unified can readily be fitted to the stationary tube 140.

Modified Form

The present invention may be modified and altered in various ways without being limited to the above-described embodiments, and such modifications and alterations are also within the technical scope of the present invention.

(1) The constitution of a lens barrel to which the present invention is applied may be modified without being limited to the disclosure of the embodiments. For instance, the actuator provided at the lens barrel may be a zoom motor for driving a zoom lens. Moreover, there is no restriction of the type of actuator, and for example it may be a stepping motor or the like.

(2) Although the supporting part supporting the gear train is formed protruding toward an outer diameter side of the stationary tube in the embodiment, the construction of the supporting part is not limited to this, and may be projected toward an inner diameter side of the supporting part. Additionally, a part of the stationary tube may be recessed toward the inner diameter side, and the recessed part may be provided with the supporting part so as to support the gear train.

(3) The lens barrel of the embodiment is an interchangeable lens that is to be fitted to a camera body, but the lens barrel is not limited to this and may be a lens barrel provided for a camera in which the lens barrel and the camera body are unified, for example.

(4) The output of the actuator is transferred to the movable part through the gear train in the embodiment, but a rotary member for transferring a driving force is not limited to this and may include a friction wheel, a pulley and/or the like, for example.

What is claimed is:

1. A lens barrel comprising:
a stationary part;
a movable part provided movably relative to the stationary part;
an actuator to generate a driving force;
a rotary member to transfer the driving force generated by the actuator to the movable part so as to move the movable part relative to the stationary part, thereby causing a lens to move relative to the stationary part; and
a supporting part provided integrally with the stationary part to support a rotary axis of the rotary member and the actuator,
wherein the supporting part supports the actuator at a first surface thereof that is opposite to a second surface thereof at which the rotary axis is supported, with respect to a direction of an optical axis of the lens.

2. The lens barrel according to claim 1, further comprising a lens barrel mount detachably engaged with a camera mount provided on a camera body, wherein the lens barrel mount facilitates the stationary part to be mounted to the camera body via the camera mount.

3. The lens barrel according to claim 1, further comprising a mount part detachably fixed to a camera body, wherein the stationary part is fixed to the mount part.

4. The lens barrel according to claim 1,
wherein the lens is accommodated in the stationary part.

5. The lens barrel according to claim 1,
wherein the rotary member is a gear train including a first gear to which an output of the actuator is transferred and a second gear that can be meshed with a third gear provided on the movable part.

6. The lens barrel according to claim 5,
wherein axes of the first gear and the second gear are arranged to be in parallel with the optical axis of the lens and to lie substantially in an arc of a circle with respect to the optical axis.

7. The lens barrel according to claim 5,
wherein an output axis of the actuator and axes of the first gear and the second gear are arranged to be in parallel with the optical axis of the lens and to lie substantially in an arc of a circle with respect to the optical axis.

8. The lens barrel according to claim 1,
wherein the stationary part comprises first part including a first supporting part to support one end of the rotary axis and a second part including a second supporting part to support the other end of the rotary axis.

9. A method of manufacturing a lens barrel, said method comprising:
providing a stationary part;
providing a movable part that is movable relative to the stationary part;
providing an actuator to generate a driving force;
providing a rotary member to transfer the driving force to the movable part so as to move the movable part relative to the stationary part, thereby causing a lens to move relative to the stationary part; and
providing a supporting part integrally with the stationary part, the supporting part supporting a rotary axis of the rotary member and the actuator,
wherein the supporting part supports the actuator at a first surface thereof that is opposite to a second surface thereof at which the rotary axis is supported, with respect to a direction of an optical axis of the lens.

10. The method according to claim 9, further comprising:
providing a lens barrel mount detachably engaged with a camera mount provided at a camera body, the lens barrel mount facilitating the stationary part to be mounted to the camera body via the camera mount.

11. The method according to claim 9, further comprising:
providing a mount part detachably fixed to a camera body, wherein the stationary part is fixed to the mount part.

12. The method according to claim 9, further comprising:
accommodating the lens in the stationary part.

13. The method according to claim 9,
wherein, the rotary member is a gear train including a first gear to which an output of the actuator is transferred and a second gear that can be meshed with a third gear provided at the movable part.

14. The method according to claim 13, further comprising:
arranging rotary axes of the first gear and the second gear to be in parallel with the optical axis of the lens and to lie substantially in an arc of a circle with respect to the optical axis.

15. The method according to claim 13, further comprising:
arranging an output axis of the actuator and axes of the first gear and the second gear to be in parallel with the optical axis of the lens and to lie substantially in an arc of a circle with respect to the optical axis.

16. The method according to claim 9, wherein:
the stationary part includes a first part including a first supporting part to support one end of the rotary axis, and a second part including a second supporting part to support the other end of the rotary axis.

17. The lens barrel according to claim 1, wherein the supporting part supports the actuator at a first position differing from a second position at which the rotary axis is supported, around the optical axis of the lens.

18. The lens barrel according to claim 1, further comprising a mount part detachably fixed to a camera body, wherein the supporting part is a separate member with respect to the mount part.

19. The method according to claim 9, wherein the supporting part supports the actuator at a first position differing from a second position at which the rotary axis is supported, around the optical axis of the lens.

20. The method according to claim 9, further comprising providing a mount part detachably fixed to a camera body, wherein the supporting part is a separate member with respect to the mount part.

* * * * *